United States Patent [19]

Lasken

[11] 4,380,278
[45] Apr. 19, 1983

[54] MULTIPLE CLUTCH CONTROL SYSTEM EMPLOYING CLUTCH STATUS MONITOR

[75] Inventor: Richard D. Lasken, Bartlett, Ill.

[73] Assignee: International Harvester Co., Chicago, Ill.

[21] Appl. No.: 241,264

[22] Filed: Mar. 6, 1981

[51] Int. Cl.³ ............................. B60K 41/22; F16D 25/10
[52] U.S. Cl. ............................. 192/3.58; 192/87.18; 74/665 G
[58] Field of Search ............ 192/3.61, 3.58, 87.13, 192/87.14, 87.18, 87.11, 87.1, .098, .075; 74/665 G, 665 GA

[56] References Cited

U.S. PATENT DOCUMENTS

| | | | |
|---|---|---|---|
| 2,936,864 | 5/1960 | Schjolin et al. | 192/87.13 X |
| 2,946,241 | 7/1960 | Snyder | 192/87.18 X |
| 3,163,270 | 12/1964 | Zingsheim | 192/87.13 X |
| 3,762,518 | 10/1973 | Hilpert | 192/87.13 X |
| 4,219,109 | 8/1980 | Ushijima et al. | 192/87.13 |
| 4,234,066 | 11/1980 | Toyota et al. | 192/3.58 X |

*Primary Examiner*—George H. Krizmanich
*Attorney, Agent, or Firm*—John W. Gaines; F. David Au Buchon

[57] ABSTRACT

A multiple clutch control system for controlling the operation of clutches in a multiple speed transmission of the type wherein the gear ratio of the transmission is altered by engaging one hydraulically operated clutch while simultaneously disengaging another hydraulically operated clutch includes circuitry responsive to the hydraulic pressure applied to the clutches for preventing simultaneous engagement of two clutches in the event that one of the clutches fails to disengage after another clutch has been engaged.

18 Claims, 3 Drawing Figures

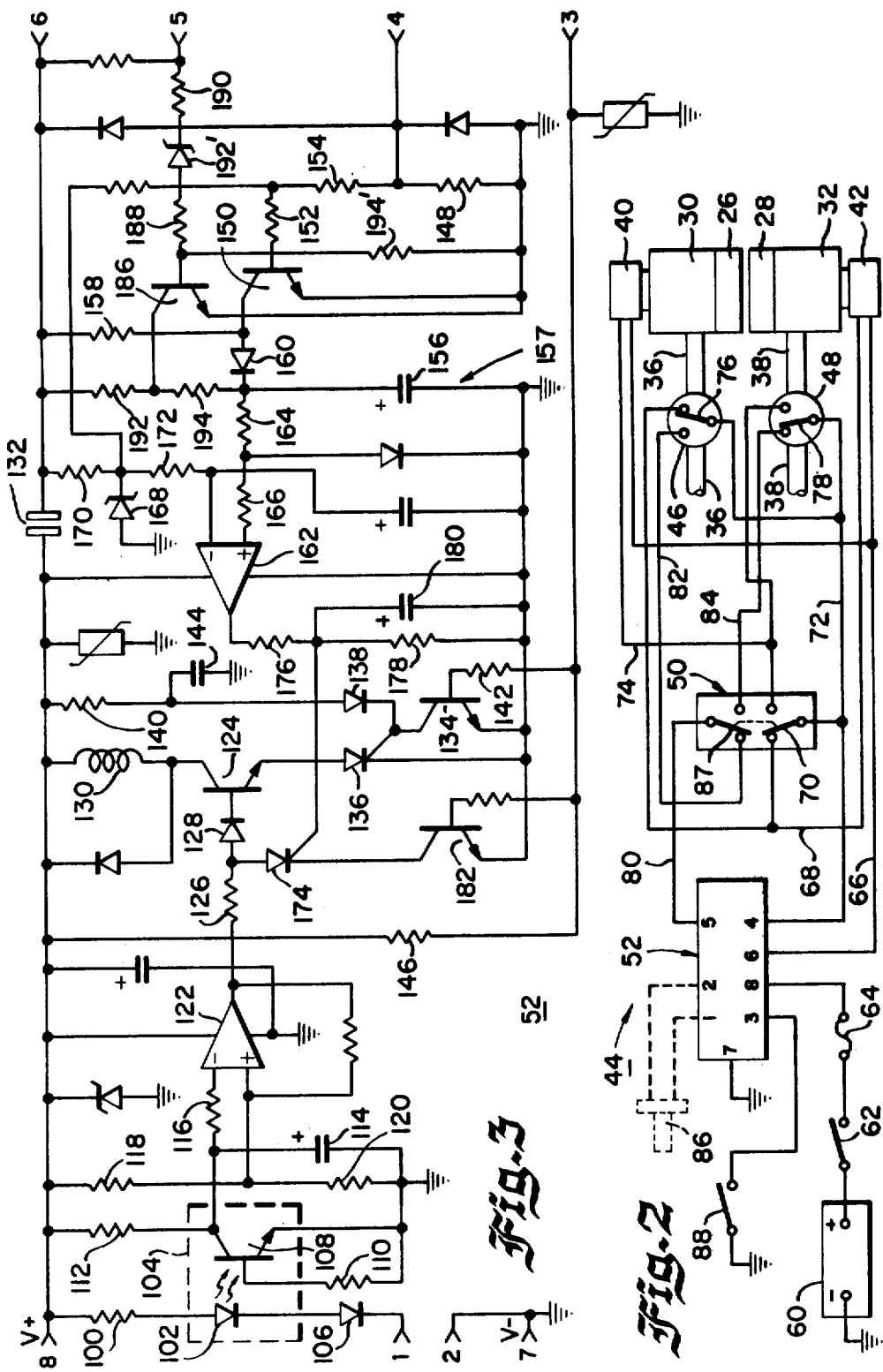

MULTIPLE CLUTCH CONTROL SYSTEM EMPLOYING CLUTCH STATUS MONITOR

BACKGROUND OF THE INVENTION

1. Field of the Invention

This invention relates to rotary power transmission systems, and more particularly, to power transmission systems utilizing a plurality of clutches for varying the gear ratio of a transmission by selectively engaging one clutch while substantially simultaneously disengaging another clutch, and even more particularly, this invention relates to a control system for such clutches that prevents simultaneous engagement of both clutches in the event that one of the clutches fails to disengage.

2. Description of the Prior Art

Transmissions that shift gears by engaging one clutch while simultaneously disengaging another clutch are known. However, many of such transmissions, particularly those using multiple plate clutches, have the disadvantage of rough shifts that jolt the vehicle during the shift, particularly if the shift is made under load, such as, for example, in a heavily loaded tractor. In order to avoid such jolt, it has been proposed for the two clutches to provide thereto a certain amount of clutch overlap whereby one or both clutches are forced slightly to slip for an instant, and wherein the clutch that carries the load prior to the shift is not disengaged until the newly engaged clutch has engaged sufficiently to transmit a substantial amount of torque.

Although such a clutch overlap control system causing temporary clutch slippage does significantly smooth out the shifting characteristics of the vehicle, there is a possibility that, in the event of a failure of a component of the control system, one of the clutches could fail to disengage after a shift. This would result in a situation wherein one or both of the engaged clutches could continue to slip with severe damage to one or more of the clutches, or to other components of the engine or transmission.

SUMMARY OF THE INVENTION

Accordingly, it is an object of the present invention to overcome many of the disadvantages of the prior art systems.

It is another object of the present invention to provide a system for preventing the inadvertent, simultaneous engagement of multiple clutches in a transmission of the type using multiple clutches to shift gear ratios.

Accordingly, in accordance with a preferred embodiment of the invention, there is provided a system that employs a pair of pressure switches and a logic control circuit for sensing the hydraulic pressures in the hydraulic control systems of a pair of hydraulically operated clutches. The logic system is responsive to the signal provided by the pressure switches and by simultaneous deenergization of both clutches serves to disengage the newly engaged clutch in the event that the previously engaged clutch has failed to disengage within a predetermined amount of time after a shift has occurred.

DESCRIPTION OF THE DRAWING

These and other objects and advantages of the present invention will become readily apparent upon consideration of the following detailed description and attached drawing, wherein:

FIG. 2 is a more detailed block diagram of the multiple clutch control system according to the invention; and FIG. 3 is a schematic circuit diagram of the logic circuitry utilized for controlling the operation of the clutches.

DETAILED DESCRIPTION OF THE PREFERRED EMBODIMENT

Figure 1:
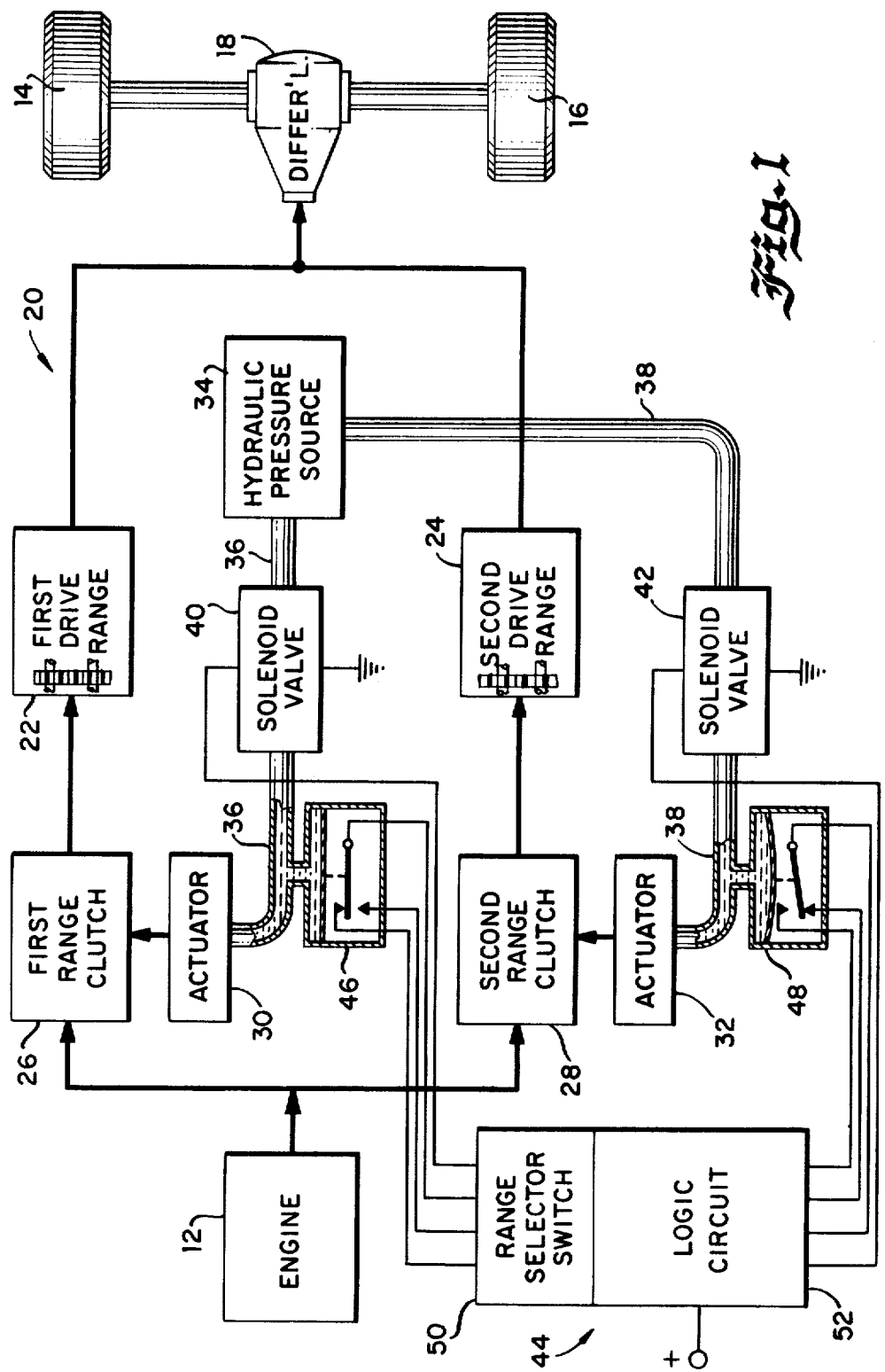
FIG. 1 is a block diagram of a vehicle employing a multiple clutch transmission utilizing the multiple clutch control system according to the invention.

Referring now to FIG. 1, there is shown a source of rotary power, such as an internal combustion engine 12 coupled to a device to be powered such as a pair of driving wheels 14 and 16 via a differential 18 and a transmission system generally designated by the reference numeral 20. The transmission system 20 is, in the present embodiment, a dual range transmission system having a first drive range 22, which may be, for example, a mechanical gear box or a direct drive, a second drive range 24, which may also be a mechanical gear box or a direct drive, but which typically will provide a different gear ratio between its input and output shafts than the first drive range 22. A first range clutch 26 is interposed between the engine 12 and the first drive range 22, and a second range clutch 28 is interposed between the engine 12 and a second drive range 24. Preferably, the first and second drive range clutches 26 and 28 are standard friction plate clutches, preferably of the multiplate type, and may be interposed between the engine 12 and the respective first and second drive ranges 22 and 24, as indicated in the drawing, between the respective drive ranges 22 and 24 and the differential 18, or even within the drive ranges 22 and 24. Moreover, the first and second drive ranges 22 and 24 may be combined into a single unit, and the first and second range clutches 26 and 28 may be disposed within the drive range unit to permit power to be selectively transferred through various gear sets within the drive range unit to effect a change in gear ratio. However, the range clutches 26 and 28, as well as the drive ranges 22 and 24, are illustrated as separate units for purposes of clarity.

Preferably, the range clutches 26 and 28 are hydraulically operated clutches that are engaged and disengaged by a pair of actuators 30 and 32, respectively. A source of hydraulic pressure 34, such as, for example, a hydraulic pump and suitable reservoir, applies hydraulic pressure to the actuators 30 and 32 via a pair of hydraulic lines 36 and 38 under the control of a pair of solenoid valves 40 and 42. The solenoid valves 40 and 42 selectively permit hydraulic pressure to be applied from the hydraulic pressure source 34 to the actuators 30 and 32, and also permit hydraulic fluid to return from the actuators 30 and 32 to a reservoir (not shown) within the hydraulic pressure source 34.

In accordance with an important aspect of the present invention, the actuators 30 and 32, and hence the clutches 26 and 28 are controlled by a control system 44 cooperating with a pair of pressure switches 46 and 48 which serves to control the solenoid valves 40 and 42. The control system 44 includes a range selector switch 50 which cooperates with a logic circuit 52 selectively to energize one of the solenoid valves 40 and 42 in accordance with the range selected by the range selector switch 50. The logic circuit 52 monitors the condition of the pressure switches 46 and 48, which in the present embodiment, are single pole, double throw switches, and serves to maintain both the solenoid valves 40 and 42 energized immediately after a shift. This causes hydraulic pressure to be applied to the actuator of the previously disengaged (or on going) clutch, while maintaining hydraulic pressure on the previously engaged (or off going) clutch. The pressure applied to the actuator of the newly engaged clutch is monitored, and after that pressure has reached a predetermined value, indicating that the newly engaged clutch is sufficiently engaged to carry appreciable torque, the logic circuitry deenergizes the solenoid valve of the previously engaged clutch, thereby causing that clutch to disengage to complete the shift. The logic circuit 52 continues to monitor the state of the pressure switches, and if the pressure switch associated with the newly disengaged clutch indicates that the clutch has not disengaged, both clutches are automatically disengaged to prevent them from being simultaneously engaged, and from being damaged.

The interconnections between the range selector switch 50, logic circuit 52 and the pressure switches 46 and 48 are illustrated in greater detail in FIG. 2. In FIG. 2, power is applied from a battery 60 via a keyswitch 62, which may be part of the vehicle ignition switch, through a fuse 64 to a terminal 8 of the logic circuit 52. Under normal operating conditions, the logic circuit 52 maintains a connection between the terminal 8 and a terminal 6 in order to apply a source or positive potential to the solenoid valve 40 and 42 via a conductor 66. The return or ground connection for the solenoid valves 40 and 42 is provided via a terminal 4 of the logic circuit 52 through the range selector switch 50 and the pressure switches 46 and 48.

With the range selector switch 50 and the pressure switches 46 and 48 positioned as shown in FIG. 2, the solenoid valve 42 is energized via the conductor 66, a conductor 68, an armature 70 of the range selector switch 50, which in the present embodiment is a double pole, double throw switch, and a conductor 72. The solenoid valve 40 is deenergized since the return or ground line 74 of the solenoid valve 40 is open circuited. Thus, the hydraulic pressure is applied only to the actuator 32. Consequently, only the clutch 28 is engaged, and the vehicle is maintained in the second drive range.

In order to shift the transmission to the first drive range, the armature 70 of the range selector switch 50 is manually switched from the position shown to its other position wherein the conductor 72 is connected to the conductor 74. This provides a complete circuit for the solenoid valve 40, and energizes the solenoid valve 40. However, although the connection between the conductor 68 and the conductor 72 via the armature 70 is now broken, the line 68 is still maintained grounded via the normally closed armature 76 of the pressure switch 46. This connection is maintained until the hydraulic pressure in the line 36 has risen sufficiently to cause the pressure switch 46 to open the circuit between the line 68 and the line 72. The level at which switch opening, as well as closing, occurs is selected to be a pressure indicating that the clutch 26 is sufficiently engaged to transmit substantial torque, and may be selected to be, for example, 58 p.s.i. for opening the switch and, for virtually a no-torque indication upon re-closing, 40 p.s.i. The opening of the circuit between the lines 68 and 72 by the pressure switch 46, deenergizes the solenoid valve 42 and causes the clutch 28 to be disengaged once the clutch 26 has picked up the load. In a similar fashion, if it is desired to shift the transmission back to the second drive range, the armature 70 of the switch 50 is again returned to the position shown in FIG. 2 to thereby reenergize the solenoid valve 42 via the conductors 66 and 68, the armatures 70 and the conductor 72. This breaks the connection between the conductor 74 and the conductor 72 via the armature 70, but the solenoid 42 is not immediately deenergized since an armature 78 of the pressure switch 48 provides an electrical connection between the conductor 74 and the conductor 72 until the pressure in the hydraulic line 38 increase sufficiently to move the armature 78 to the position shown in FIG. 2. This breaks the circuit between the conductor 74 and the conductor 72, deenergizes the solenoid valve 40 and disengages the clutch 26.

The pressure switches 46 and 48 serve to provide an overlap period wherein both of the solenoid valves 40 and 42 are energized and both clutches 26 and 28 are engaged in order to smooth the transition between the different gear ratios. However, it is possible for one of the solenoid valves 40 and 42 or pressure switches 46 and 48 to fail. In such an event, both of the clutches 26 and 28 could be maintained engaged for a substantial period of time, thereby causing damage to the clutches. Therefore, in accordance with another important aspect of the present invention, the logic circuit 52 is coupled to the pressure switches 46 and 48 via a second pole of the switch 50. Thus, the logic circuit 52 monitors the state of the pressure switches 46 and 48 via a conductor 80 that is selectively connected to one of a pair of conductor 82 and 84 by an armature 86. Consequently, when one of the solenoids 40 and 42 is energized, the one of the pressure switches 46 and 48 associated with the opposite solenoid valve is monitored to assure that pressure is not present in the hydraulic line operating the clutch that should be disengaged. Such monitoring is capable of detecting a failure in any one of the solenoid valves 40 and 42 or in either of the pressure switches 46 and 46.

In operation, the logic circuit 52 is enabled by closing the keyswitch 62 which supplies power to the logic circuit 52. Optionally, an RPM transducer 86 may be coupled to the logic circuit 52 to render the logic circuit 52 operative only when the RPM transducer 86 indicates that the engine is running. A foot clutch operated switch 88, for example, is used to reset the logic circuits 52 each time the master clutch (not shown), which completely interrupts the flow of power from the engine 12 to the differential 18, is disengaged.

Referring now to FIG. 3, there is shown a schematic diagram of the logic circuit 52 having various numbered inputs that correspond to the numbers of the inputs of the logic circuit 52 shown in FIG. 2. Thus, inputs 1 and 2 (FIG. 3) would be connected to the RPM transducer 86, if used, input 8 would be connected to a source of positive potential, preferably the keyswitch 62, input 7 would be grounded, output 5 would provide power to the solenoid valves 40 and 42, input 5 would receive signals from the pressure switches 46 and 48, and input 4 would provide a ground return for the solenoids 40 and 42.

In operation, when the keyswitch 62 of the vehicle is turned on, a positive voltage is applied to pin 8 of the circuit 52. If an RPM transducer were employed, it would be connected between pin 1 and 2 of the logic 52, thus establishing a current path through a resistor 100, a light emitting diode 102 of an optoisolator 104, a transient protection diode 106, the RPM transducer 86 and ground. Thus, with the RPM transducer 86 indicating that the engine is running, current would flow through the light emitting diode 102 of the optoisolator 104 and cause an output transistor 108 to conduct whenever the engine was running. If an RPM trnsducer were not employed, the pins 1 and 2 of the logic circuit 52 would be connected directly together, and under such conditions, the light emitting diode 102 would be energized whenever the keyswitch was closed, regardless of whether or not the engine was running. In many applications, this is sufficient since the keyswitch is normally not left on with the engine not running.

When the light emitting diode 102 is energized by the closing of the keyswitch 62 (or otherwise), the transistor 108, which is normally maintained in a nonconductive condition by a biasing resistor 110, is rendered conductive. This causes the voltage at the junction of the collector of the transistor 108, a load resistor 112, a smoothing capacitor 114 and a coupling resistor 116 to drop below the reference voltage present at the junction of a pair of resistors 118 and 120. This drop in voltage causes the output of an operational amplifier 122 to go high, thereby rendering a transistor 124 conductive by applying positive potential to its base via a resistor 126 and a diode 128. The conduction of the transistor 124 causes the transistor 124 to energize a relay coil 130 to thereby close a pair of relay contacts 132 which serve to supply power to the solenoid valves 40 and 42. In the event that the voltage from the keyswitch 62 applied to pin 8 is removed, or if the signal from the transducer 86 (when such a transducer is used) is removed, drive to the base of the transistor 124 is terminated, thus deenergizing the relay coil 130 and opening the relay contact 132 to prevent the solenoid valves 40 and 42 from being energized. Thus, the circuitry just described serves to monitor the closure of the keyswitch 62 and/or engine RPM and to disengage the clutches in the event of an abnormal condition.

A circuit comprising a transistor 134, a silicon controlled rectifier 136, a diode 138, resistors 140 and 142, and a capacitor 144 serves as a reset circuit and to disable both solenoid valves in the event of a power failure, or if the battery voltage becomes intermittent. When the logic circuit 52 is first energized by applying power to pin 8, the transistor 134 is rendered conductive by a current applied to its base via the resistor 142 and a resistor 146. This causes the gate of the silicon controlled rectifier 136 to be connected to its cathode, thereby preventing the silicon controlled rectifier 136 from being rendered conductive, and also preventing the relay coil 130 from being energized. Thus, in order to render the silicon controlled rectifier 136 conductive, the clutch switch 88, connected to pin 3 of the circuit 52, must be closed momentarily by depressing the clutch pedal in order to momentarily render the transistor 134 nonconductive. This permits current to flow through the resistor 140, the diode 138 into the gate of the silicon controlled rectifier 136 to thereby render the silicon controlled rectifier 136 conductive. The silicon controlled rectifier 136 then remains conductive unless another interruption in battery power occurs, at which time it is again rendered nonconductive. If such an interruption occurs, the silicon controlled rectifier 136 remains nonconductive until the clutch switch 88 is again depressed, regardless of whether or not battery voltage is reapplied to the system. The capacitor 144 serves to limit the rate at which the voltage at the junction of the resistor 140 and the capacitor 144 rises to assure that the transistor 134 is rendered conductive before the silicon controlled rectifier 136 to thereby prevent an inadvertent turn on of the silicon controlled rectifier 136 when power is first applied to the circuit.

A similar circuit is used to deenergize the relay coil 130 when an intermittent condition is detected in the voltage applied to the solenoid valves 40 and 42. When one of the solenoids 40 and 42 is energized, current flows from pin 6 of the logic circuit 52 through one of the solenoid valves 40 and 42 into pin 4 of the logic circuit 52 and through a low resistance resistor 148 to ground. The current flow causes a voltage to appear across the resistor 148. This voltage is applied to the base of a transistor 150 via a pair of resistors 152 and 154, and renders the transistor 150 conductive whenever current is flowing through either one of the solenoid valves 40 or 42. During this condition, the collector of the transistor 150 is maintained near ground potential, thereby preventing a capacitor 156 in a capacitor network circuit 157 from being charged through a resistor 158 and a diode 160.

In the event of an interruption in the flow of power to the solenoid valves, the voltage across the resistor 148 drops. This drop turns the transistor 150 off, and permits the capacitor 156 to charge at a rate determined by the values of the capacitor 156 and the resistor 158. The voltage across the capacitor 156 is applied to the noninverting input of an operational amplifier 162 via a pair of resistors 164 and 166. When this voltage exceeds a reference voltage developed at the junction of a Zener diode 168 and a resistor 170, which voltage is applied to the inverting input of the amplifier 162 via a resistor 172, the output of the operational amplifier 162 goes high. Typically, the values of the resistor 168 and the capacitor 156 are chosen so that approximately 350 milliseconds to approximately 1100 milliseconds are required before the voltage across the capacitor 156 exceeds the voltage across the Zener diode 168. These times are the approximate times required for a shift between drive ranges to occur.

The output of the operational amplifier 162 is applied to the gate of a silicon controlled rectifier 174 via a network including a resistor 176, a resistor 178 and a capacitor 180, and causes the silicon controlled rectifier 174 to be rendered conductive. The current path through the anode terminal of the silicon controlled rectifier 174 is completed through a transistor 182 which is normally maintained conductive whenever the clutch switch 88 is open by a bias network containing the resistor 146 and a resistor 184. Thus, in the event of an interruption in the flow of current through either of the solenoid valves 40 or 42 that exceeds the normal shifting time, the silicon controlled rectifier 174 will be fired. This will render the transistor 124 nonconductive and deenergize the relay coil 130. The result is to thereby open the relay contacts 132, and consequently to disengage the engaged clutch 26 or 28 by deenergizing and therefore closing the appropriate solenoid valve. Even if the intermittent wire should reconnect itself, the relay coil 130 will remain deenergized until the logic circuit 52 is reset by depressing the clutch and closing the clutch switch 88 to thereby interrupt the flow of current through the silicon controlled rectifier 174 and render the silicon controlled rectifier 174 nonconductive.

As previously discussed, when the transmission is being shifted between ranges, both of the solenoid valves 40 and 42 are simultaneously engaged for a predetermined overlap time period during the shift. One of the functions of the logic circuit 52 is to monitor the pressures switches 46 and 48 to assure that the predetermined overlap time period when both clutches are engaged is not exceeded. This function is accomplished by monitoring the signal of the pressure switch associated with the off going clutch applied to pin 5 of the logic circuit 52.

Prior to a shift, the pressure switch of the disengaged clutch is connected to pin 5 of the logic circuit 52. If all components are operating properly, the pressure in the hydraulic system of the disengaged clutch should be low and result in a positive voltage being applied to pin 5 of the logic circuit 52. This positive voltage will be applied to the base of a transistor 186 via a pair of resistors 188, 190 and a Zener diode 192'. Consequently, the transistor 186 will be rendered conductive, thereby bringing the voltage at the junction of a pair of resistors 192 and 194 to approximately ground potential and preventing the charging of the capacitor 156 through the resistors 192 and 194.

After the shift is made by manually switching the armature 70 of the range selector switch to its other position, the pressure switch previously being monitored is disconnected from pin 5 by the range selector switch 50, and the other pressure switch, i.e., the pressure switch associated with the then engaged off going clutch is connected to pin 5. As previously stated, the pressure of the hydraulic system of the off going clutch will not drop immediately, but will remain high for a predetermined time interval during the shift. This pressure in the hydraulic line of the off going clutch will be reflected as a drop in the voltage applied to pin 5 of the logic circuit 52. This voltage will be below the break over voltage of the Zener diode 192', thereby causing the base of the transistor 186 to be effectively isolated from the input pin 5. When this occurs, the base of the transistor 186 will be maintained at ground potential via a resistor 194', thus rendering the transistor 186 nonconductive. The rendering of the transistor 186 nonconductive allows the capacitor network circuit 157 to go into operation and the capacitor 156 to charge through the resistors 192 and 194 until (in the event of a malfunction) the voltage across the capacitor 156 rises sufficiently to cause the operational amplifier 162 to fire the silicon controlled rectifier 174 and to deenergize the relay coil 130 as previously described.

However, under normal operating conditions, the above described sequence of events will not occur since the shift will have been completed before the voltage across the capacitor 156 in circuit 157 is sufficient to cause the operational amplifier 162 to fire the silicon controlled rectifier 174. This is because, under normal operating conditions, the length of time that the off going clutch is maintained engaged after pressure is applied to the actuator of the on going clutch is typically on the order of approximately 0.5 seconds. Thus, the potential at pin 5 of the logic circuit 52 remains low only approximately 0.5 seconds after the shift, at which time the pressure in the hydraulic line associated with the off going clutch reduces to or below 40 p.s.i., and the voltage applied to pin 5 increases to its previous level. This causes the transistor 186 to be rendered conductive again, and to discharge the capacitor 156 through the resistor 194. Consequently, by selecting the values of the resistors 192 and 194 such that the time required for the voltage across the capacitor 156 to reach a value sufficient to fire the silicon controlled rectifier 174 is longer than a typical shift time, the circuit 157 will not be affected by normal shifts, and will cause the solenoid valve to be deenergized only in the event of a malfunction. Thus the resistors 192 and 194 and the capacitor 156 form part of a timing means which defines a time interval during which both clutches may be simultaneously engaged. If this time interval is exceeded, the circuit 157 and the supply relay 130,132 overcontrol the solenoids 40,42 of the clutch valves and the clutches will automatically disengage. For a system having a typical shift time on the order of 0.5 seconds, the values of the resistors 192 and 194 may be selected to cause this time interval to be on the order of approximately 1.0 to 1.5 seconds.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. In a rotary power transmission of the type having a plurality of gears and first and second clutches cooperating with said gears for shifting the transmission from a first gear ratio to a second gear ratio by engaging the first clutch and disengaging the second clutch after a transitory operational period of clutch overlap, the improvement comprising means responsive to the engagement of said first and second clutches for preventing said first and second clutches from being simultaneously engaged for more than a predetermined time interval, said simultaneous engagement preventing means having monitor means (48,84,87,80 pin 5) effective to afford operation thereof and connected to continuously monitor the second clutch, throughout said predetermined time interval, for failure to in fact disengage therewithin, whereupon the monitor means is effective so as to afford the desired operation of the simultaneous engagement preventing means.

2. The improvement recited in claim 1 wherein said simultaneous engagement preventing means includes timing means responsive to said first and second clutches being simultaneously engaged for disengaging at least one of said clutches when said first and second clutches have been simultaneously engaged for a predetermined time interval.

3. The improvement recited in claim 2 wherein said timing means is an electrically operated timing means.

4. The improvement recited in claim 1 wherein said simultaneous engagement preventing means is electrically operated and includes means for electrically controlling the engagement and disengagement of said clutches, and first and second pressure switches responsive to the engagement and disengagement of said clutches.

5. A rotary power transmission system comprising:
  a power input shaft;
  a power output shaft;
  means interposed between said power input shaft and said power output shaft for transferring power between said power input shaft and said power output shaft at a first predetermined rotational speed ratio;
  second means interposed between said power input shaft and said power output shaft for transferring power between said power input shaft and said power output shaft at a second predetermined rotational speed ratio;

first clutch means cooperating with said first power transferring means for selectively interrupting the flow of power through said first power transferring means between said power input shaft and said power output shaft;

second clutch means cooperating with said second power transferring means for selectively interrupting the flow of power through said second power transferring means between said power input shaft and said power output shaft;

first actuator means coupled to said first clutch means for selectively engaging and disengaging said first clutch means;

second actuator means coupled to said second clutch means for selectively engaging and disengaging said second clutch means;

selector means for selectively causing said first and second actuator means to selectively engage one of said first and second clutch means, and therefollowing to disengage the other one of said first and second clutch means after a predetermined time interval; and means responsive to the engagement of said clutches for preventing both of said clutches from being simultaneously engaged for more than a predetermined time interval said simultaneous engagement preventing means having monitor means (48, 84, 87, 80, pin 5) effective to afford operation thereof and connected to continuously monitor the second clutch, throughout said predetermined time interval, for failure to in fact disengage therewithin, whereupon the monitor means is effective so as to afford the desired operation of the simultaneous engagement preventing means.

6. A rotary power transmission system comprising:
a power input shaft;
a power output shaft;
means interposed between said power input shaft and said power output shaft for transferring power between said power input shaft and said power output shaft at a first predetermined rotational speed ratio;
second means interposed between said power input shaft and said power output shaft for transferring power between said power input shaft and said power output shaft at a second predetermined rotational speed ratio;
first clutch means cooperating with said first power transferring means for selectively interrupting the flow of power through said first power transferring means between said power input shaft and said power output shaft;
second clutch means cooperating with said second power transferring means for selectively interrupting the flow of power through said second power transferring means between said power input shaft and said power output shaft;
first actuator means coupled to said first clutch means for selectively engaging and disengaging said first clutch means;
second actuator means coupled to said second clutch means for selectively engaging and disengaging said second clutch means;
selector means for selectively causing said first and second actuator means to selectively engage one of said first and second clutch means and to disengage the other one of said first and second clutch means; and means responsive to the engagement of said clutches for preventing both of said clutches from being simultaneously engaged for more than a predetermined time interval;

said system characterized wherein said selector means includes a manually operable selector switch electrically coupled to said preventing means and having a first condition of operation and a second condition of operation, and wherein said first and second actuator means are electrically coupled to said preventing means and responsive to the condition of operation of said selector switch, said first actuator means being operative to engage said first clutch means when said selector switch is in the first condition of operation, said second actuator means being operative to engage said second clutch means when said selector switch is in the second condition of operation.

7. A rotary power transmission system as recited in claim 6 wherein said preventing means includes a first sensing switch responsive to the actuation of said first clutch means and a second sensing switch responsive to the actuation of said second clutch means.

8. A rotary power transmission system as recited in claim 7 wherein said preventing means includes timing means electrically coupled to said sensing switches and responsive thereto for causing said preventing means to disengage at least one of said clutches whenever said sensing switches indicate that both of said clutches have been simultaneously engaged for said time interval.

9. A rotary power transmission system as recited in claim 8 wherein said first actuating means includes a first hydraulic actuator, and said second actuating means includes a second hydraulic actuator, said system further including a source of hydraulic pressure and means including first and second electrically operated hydraulic valves for selectively applying hydraulic pressure from said source to said first and second hydraulic actuators, respectively.

10. A rotary power transmission system as recited in claim 9 wherein said first sensing switch includes a first pressure switch responsive to the hydraulic pressure applied to the first hydraulic actuator and said second sensing switch includes a second pressure switch responsive to the hydraulic pressure applied to said second actuator.

11. A rotary power transmission system as recited in claim 9 wherein said preventing means includes means responsive to an interruption in the electrical power applied to said first and second electrically operated hydraulic valves for rendering said valves operative to disengage at least one of said clutches upon the occurrence of an interruption.

12. A rotary power transmission system as recited in claim 8 wherein said preventing means is electrically operated and includes means responsive to an interruption in electrical power applied to said preventing means for disengaging at least one of said clutches upon the occurrence of an interruption.

13. A rotary power transmission system as recited in claim 8 wherein said power input shaft is adapted to be driven by an internal combustion engine, and wherein said preventing means includes means responsive to the operation of the engine for causing said preventing means to disengage both of said clutches when the engine is not operating.

14. A rotary power transmission system as recited in claim 13 wherein said engine operation responsive means includes means responsive to the rotation of the engine.

15. Failure detecting control for a gear drive transmission with a multi-speed function obtained by a shifting operation to a first clutch for selecting a first gear ratio, from a second clutch affording a second selective gear ratio, comprising:
   first means which first engages the first clutch;
   second means which, with delay, then disengages the second clutch; and
   overcontrol means (157) which, when the second clutch delayed disengagement takes longer than a predetermined time interval, disengages at least one of the clutches.

16. Failure detecting control for a gear drive transmission having first and second clutches for shifting from a first transmission gear ratio to a second transmission gear ratio when the first clutch engages and the second clutch disengages after a transitory period of clutch overlap, comprising:
   monitor means (76) effective to detect, at a first time, that the first clutch engages;
   monitor means (78) effective to detect, at a second time, that the second clutch disengages; and
   clutch disengaging interval timer means (78, 84, 87, 80, pin 5, 188, 157) effective, when the difference between the first and second times is taking longer than a predetermined interval of time, to disengage at least the first clutch.

17. In a rotary power transmission of the type having a plurality of gears and first and second clutches cooperating with said gears for shifting the transmission from a first gear ratio to a second gear ratio by engaging the first clutch and disengaging the second clutch after a transitory operational period of clutch overlap, and means responsive to the engagement of the first and second clutches for preventing said first and second clutches from being simultaneously engaged for more than a predetermined time interval, the improvement comprising:
   an interval measuring electric timer (157, 174, 124, 130, 132) effective when the first clutch first engages to thereupon activate and, therefollowing, to interrupt the engagement of at least one of the clutches after the time has been activated over such a predetermined time interval; and
   means (48, 84, 87, 80, pin 5, 186) responsive to disengagement of the second clutch immediately to prevent the electric timer from interrupting the engagement of any clutch.

18. Method of failure-detection control over a gear drive transmission having first and second clutches for shifting from a first transmission gear ratio to a second transmission gear ratio when the first clutch engages and the second clutch disengages after a transitory period of clutch overlap, comprising:
   monitoring to detect, at a first time, that the first clutch engages;
   monitoring to detect, at a second time, that the second clutch disengages; and
   establishing a predetermined time interval and automatically disengaging at least the first clutch when the difference between the first and second times is taking longer than the predetermined time interval established.

* * * * *